US008685566B2

(12) United States Patent
Schougaard et al.

(10) Patent No.: US 8,685,566 B2
(45) Date of Patent: Apr. 1, 2014

(54) PROCESS TO INDUCE POLYMERIZATION OF AN ORGANIC ELECTRONICALLY CONDUCTIVE POLYMER

(75) Inventors: Steen Brian Schougaard, Montreal (CA); Michel Gauthier, La Prairie (CA); Christian Kuss, Montreal (CA); David Lepage, Valleyfield (CA); Guoxian Liang, St. Hyacinthe (CA); Christophe Michot, Montreal (CA)

(73) Assignee: Clariant (Canada) Inc.

( * ) Notice: Subject to any disclaimer, the term of this patent is extended or adjusted under 35 U.S.C. 154(b) by 31 days.

(21) Appl. No.: 13/375,250

(22) PCT Filed: Jun. 1, 2010

(86) PCT No.: PCT/CA2010/000829
§ 371 (c)(1),
(2), (4) Date: Feb. 15, 2012

(87) PCT Pub. No.: WO2010/139060
PCT Pub. Date: Dec. 9, 2010

(65) Prior Publication Data
US 2012/0136136 A1 May 31, 2012

Related U.S. Application Data

(60) Provisional application No. 61/183,063, filed on Jun. 1, 2009.

(51) Int. Cl.
*H01M 4/13* (2010.01)

(52) U.S. Cl.
USPC .................. 429/231.1; 429/231.95; 429/221; 429/224; 429/223; 429/231.3; 429/232; 429/231.5; 429/213; 528/379; 528/277; 528/380; 528/378

(58) Field of Classification Search
USPC .............. 429/231.1, 231.95, 224, 221, 231.3, 429/223, 231.5, 232, 213; 528/379, 277, 528/378, 380
See application file for complete search history.

(56) References Cited

U.S. PATENT DOCUMENTS

| 5,910,382 | A | 6/1999 | Goodenough et al. |
|---|---|---|---|
| 6,391,493 | B1 | 5/2002 | Goodenough et al. |
| 6,514,640 | B1 | 2/2003 | Armand et al. |
| 6,855,273 | B2 | 2/2005 | Ravet et al. |
| 6,963,666 | B2 | 11/2005 | Abe |
| 2004/0018430 | A1* | 1/2004 | Holman et al. ............... 429/233 |
| 2007/0082267 | A1 | 4/2007 | Goodenough et al. |
| 2009/0117020 | A1 | 5/2009 | Manthiram et al. |

FOREIGN PATENT DOCUMENTS

| CA | 2 610 706 A1 | 12/2006 |
|---|---|---|
| CA | 2610706 | 12/2006 |
| JP | 2003-292307 | 10/2003 |
| JP | 2005-50684 A | 2/2005 |

(Continued)

OTHER PUBLICATIONS

Park et al. (Adv. Mater. 2007, 19, 848-851).*

(Continued)

*Primary Examiner* — Shane Fang

(57) ABSTRACT

A process to induce polymerization of an organic electronically conductive polymer in the presence of a partially delithiated alkali metal phosphate which acts as the polymerization initiator.

34 Claims, 2 Drawing Sheets

(56) References Cited

FOREIGN PATENT DOCUMENTS

| WO | WO 02/27823 A1 | 4/2002 |
|---|---|---|
| WO | WO 02/27824 A1 | 4/2002 |
| WO | WO2006/130766 | 12/2006 |
| WO | WO 2006/130766 A2 | 12/2006 |
| WO | WO2010/129417 | 11/2010 |

OTHER PUBLICATIONS

International Search Report (PCT/ISA/210) issued on Sep. 15, 2010, by Canadian Patent Office as the International Searching Authority for International Application No. PCT/CA2010/000829.
Written Opinion (PCT/ISA/237) issued on Sep. 15, 2010, by Canadian Patent Office as the International Searching Authority for International Application No. PCT/CA2010/000829.
V. Lemos et al., "A new insight into the $LiFePO_4$ delithiation process", Solid State Ionics, 2006, pp. 1021-1025.
J. Marzec et al., "Delithiation of olivine—structured $LiFe_xMn_{1-x}PO_4$ cathode materials. Mössbauer studies", Material Science—Poland, vol. 24, No. 1, 2006, pp. 68-74.
C.M. Julien et al., "Nanoscopic scale studies of $LiFePO_4$ as cathode material in lithium-ion batteries for HEV application", Ionics, 2007, pp. 395-411.

Wang, G.X. et al. "An Investigation of Polypyrrole-$LiFePo_4$Composite Cathode Materials for Lithium-ion Batteries", *Electrochimica Acta*, (2005) 4649-4654, 50 Elsevier Ltd.
International Search Report issued on Sep. 15, 2010 in connection with International Patent Application PCT/ CA2010/000829, 3 pages.
Written Opinion of the International Searching Authority issued on Sep. 15, 2010 in connection with International Patent Application PCT/CA2010/000829, 3 pages.
Lemos V. et al., "A New Insight Into the LiFePO4 Delithiation Process", Solid State Ionics, 2006, vol. 177, pp. 1021-1025 - Introduction, Experimental.
Marzec J. et al., "Delithiation of Olivine—Structured LiFexMn1-xPO4 Cathode Materials", Mossbauer Studies, Materials Science-Poland, vol. 24, no. 1, 2006 , pp. 69-74.
Extended European Search Report issued on Nov. 16, 2012 in connection with European Patent Application 10782863.4, 7 pages.
Julien, C.M. et al., "Nanoscopic Scale Studies of LiFePO4 as cathode material in lithium-ion batteries for HEV Application", Ionics (2007) 13: 395-411.
Wang, G.X., et al., "An investigation of polypyrrole-LiFePO4 composite cathode materials for lithium-ion batteries", Electrochimica Acta, 50 (2005), 4649-4654.
English translation of First Office Action issued on Feb., 22, 2013 in connection with Chinese Patent Application 201080024216.1, 9 pages.

\* cited by examiner

PROCESS TO INDUCE POLYMERIZATION OF AN ORGANIC ELECTRONICALLY CONDUCTIVE POLYMER

CROSS-REFERENCE TO RELATED APPLICATIONS

This application is a National Phase Entry of International PCT patent application No. PCT/CA2010/000829 filed on Jun. 1, 2010 by Schougaard et al. designating the United States and which claimed the benefit of priority based on: U.S. Provisional Application 61/183,063 which was filed Jun. 1, 2009. The contents of each of PCT/CA2010/000829 and 61/183,063 are expressly incorporated herein by reference in their entirety.

BACKGROUND OF THE INVENTION

1. Field of the Invention

The invention relates to a process to induce polymerization of an organic electronically conductive polymer in the presence of a partially delithiated alkali metal phosphate which acts as the polymerization initiator.

2. Description of the Related Art

Lithium-ion batteries have known a phenomenal technical success and commercial growth since the initial work by Sony in the early 90's based on lithium insertion electrodes, essentially the high voltage cobalt oxide cathode invented by J. B. Goodenough and the carbon anode using coke or graphitized carbonaceous materials.

In the mid 90's, Goodenough (See U.S. Pat. Nos. 5,910,382 and 6,391,493) suggested that polyanionic phosphate structures, namely nasicons and olivines, could raise the redox potential of low cost and environmentally compatible transition metals such as Fe, until then associated to a low voltage of insertion. For example $LiFePO_4$ was shown to reversibly insert-deinsert lithium-ion at a voltage of 3.45 V vs a lithium anode corresponding to a two-phase reaction. Furthermore, covalently bounded oxygen atom in the phosphate polyanion eliminates the cathode instability observed in fully charged layered oxides, making an inherently safe lithium-ion battery.

As pointed out by Goodenough (U.S. Pat. Nos. 5,910,382 & 6,514,640), one drawback associated with the covalently bonded polyanions in $LiFePO_4$ cathode materials is the low electronic conductivity and limited $Li^+$ diffusivity in the material. Reducing $LiFePO_4$ particles to the nanoscale level was pointed out as one solution to these problems as was the partial supplementation of the iron metal or phosphate polyanions by other metal or anions.

One significant improvement to the problem of low electronic conductivity of complex metal oxide cathode powder and more specifically of metal phosphate was achieved with the use of an organic carbon precursor that is pyrolysed onto the cathode material or its precursor to improve electrical field at the level of the cathode particles [Ravet (U.S. Pat. Nos. 6,963,666, 6,855,273, WO 02/027824 and WO 02/027823)].

Preparation of a composite cathode of complex metal oxide with an electronically conductive polymer (ECP) could also overcome low electronic conductivity of complex metal oxide, as demonstrated for example by Wang et al. [An investigation of polypyrrole-$LiFePO_4$ composite cathode materials for lithium-ion batteries, Electrochimica Acta, 50 (2005) 4649-4654]. Wang disclosed preparation of a $LiFePO_4$-polypyrrole composite cathode by chemically initiating polymerization of pyrrole by $FeCl_3$ in a water dispersion of $LiFePO_4$ and sodium p-toluene-sulfonate as counter-anion. Goodenough et al. also disclosed in WO 06/130766 composite of pyrolytic carbon-coated $LiFePO_4$ (C—$LiFePO_4$) and polypyrrole obtained by electropolymerization of pyrrole.

At industrial scale, electropolymerization is not a convenient process and known chemical routes to prepare $LiFePO_4$-ECP composite are also unsatisfactory.

Problems remain to find a convenient and up-scalable process allowing preparation of surface modified lithium metal phosphate with an electronically conductive polymer.

SUMMARY OF THE INVENTION

In view to overcome limitation of known process to prepare surface modified lithium metal phosphate with an electronically conductive polymer, inventors have developed a process to induce polymerization of an organic electronically conductive polymer which is described below.

In accordance with a broad aspect, the invention relates to a process to induce polymerization of an organic electronically conductive polymer in the presence of a partially delithiated alkali metal phosphate of the general formula $A_{1-x}MXO_4$, where A represents Li, alone or partially replaced by at most 10% as atoms of Na or K, where $0<x \leq 1$, where M comprises iron and/or manganese, and where $XO_4$ represents $PO_4$, alone or partially replaced by at most 10% at. of at least one group selected from $SO_4$ and $SiO_4$, characterized in that the partially delithiated alkali metal phosphate acts as polymerization initiator of unsaturated monomers (or a mixture thereof) which are used as precursor of the electronic conductive polymer.

In accordance with a broad aspect, the invention also relates to convenient routes to obtain such partially delithiated lithium metal phosphate by treatment with selected oxidizers.

In accordance with a specific implementation, the above described process could be applied with lithium metal phosphate and/or carbon-coated lithium metal phosphate. In a specific example of implementation, the carbon-coated lithium metal phosphate may be obtained by pyrolysis of an organic carbon precursor onto the cathode material or its precursors.

In one embodiment, the electronic conductive polymer is at least partially grafted on the surface of the alkali metal phosphate.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of the embodiments of the present invention is provided herein below, by way of example only, with reference to the accompanying drawings, in which.

Figure 1:
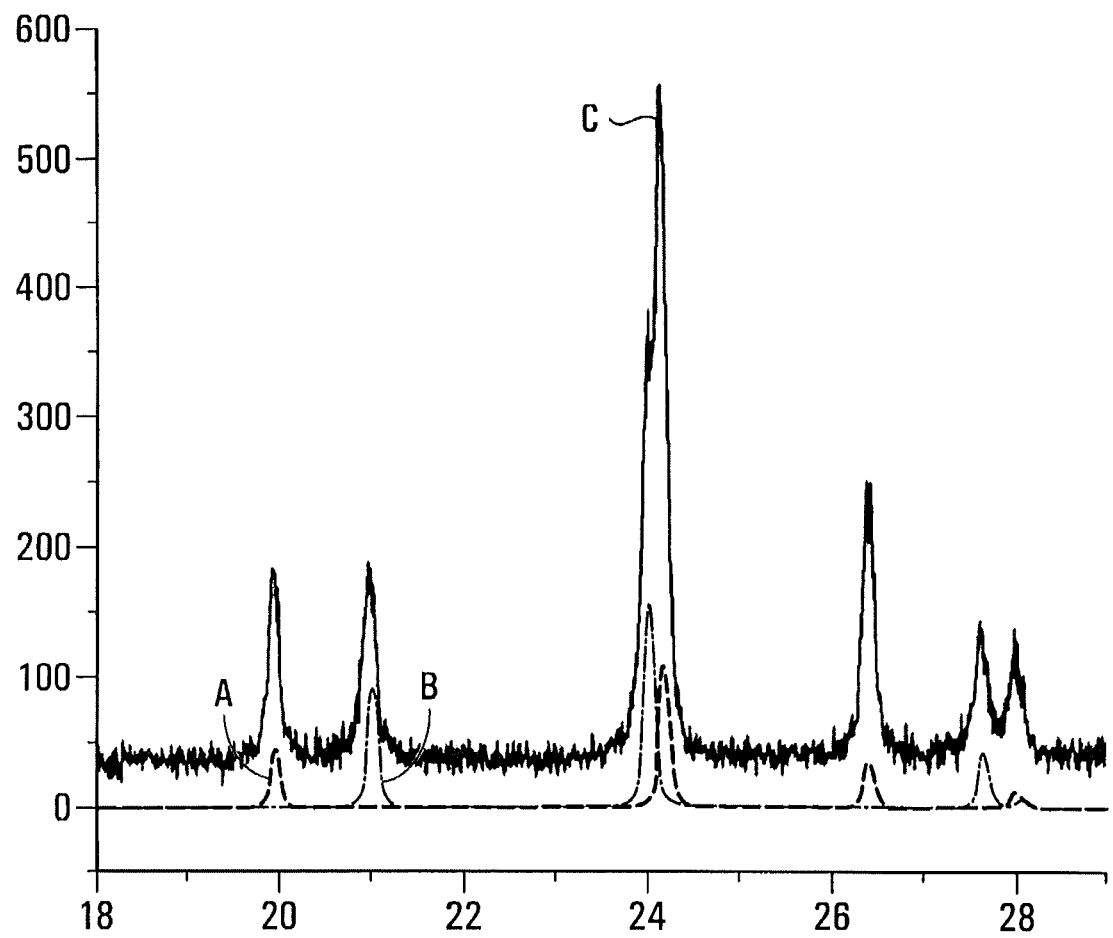
FIG. 1 represents the XRD diagrams (CoKα) of C—$LiFePO_4$ (Life Power® P1, available from Phostech Lithium) as received (Curve A), C—$FePO_4$ heterosite obtained by delithiation of C—$LiFePO_4$ (Curve B) and partially delithiated C—$LiFePO_4$ (Curve C) as prepared in example 1.

The capacity of the LiFePO$_4$-PEDOT cathode obtained during the 1$^{st}$ discharge cycle in slow scan voltametry is 144.5 mAh/g.

DESCRIPTION OF ILLUSTRATIVE EMBODIMENTS

The aim of the present invention is a process to initiate oxidative polymerization of unsaturated monomers by an at least partially delithiated alkali metal phosphate of the general formula A$_{1-x}$MXO$_4$, where A represents Li, alone or partially replaced by at most 10% as atoms of Na or K, where 0<x≤1, where M comprises iron and/or manganese, and where XO$_4$ represents PO$_4$, alone or partially replaced by at most 10% at. of at least one group selected from SO$_4$ and SiO$_4$, to form an electrically conductive polymer of a π electron conjugated system having p-type doping characteristics. In one embodiment, the electrically conductive polymer is formed at the surface of the alkali metal phosphate.

In a non-limiting example, polymers useful in the present invention, include polymers comprising conjugated regions, or composed entirely, of repeating units which are substituted or unsubstituted aniline, thiophene, pyrrole, phenyl mercaptan, furan, polyaniline, polythiophene, polypyrrole, poly(p-phenylene sulfide), polyfuran and copolymers of these polymers. In a non-limiting example, polymers which are also useful in the present invention also include polymers of any of the corresponding monomers which are ring-substituted with one or more straight or branched alkyl, alkenyl, oxa-alkyl, oxa-alkenyl, aza-alkyl, aza-alkenyl, thia-alkyl, thia-alkenyl, sila-alkyl, sila-alkenyl, aryl, aryl-alkyl, alkyl-aryl, alkenyl-aryl, dialkylamino and dialkylazo radicals, which can contain from 1 up to about 30 carbon atoms. At least two radicals could be joined to form a cycle. It will also be recognized that polymers incorporated within the compositions of matter of the present invention may also be copolymers of any one or more of the above monomers with other comonomers having ethylenic unsaturation.

In accordance with a specific preferred example, polythiophene compounds (a polymer compounds having repeating units containing a thiophene skeleton (thiophene or its derivative)) is an electrically conductive polymer of a π electron conjugated compound having p-type doping characteristics formed in the present invention.

Such polythiophene compounds include a polythiophene compound containing a repeating unit represented by the following formula (I):

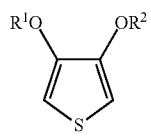

In the formula (I), R$^1$ and R$^2$ are independently a hydrogen or an alkyl groups having 1 to 4 carbon atoms, or may bond to each other to form an alkylene group having 1 to 4 carbon atoms, 1,2-cyclohexene group or o-xylylene group, which may be substituted. Of these polythiophene compounds, PEDOT is particularly preferable. These polythiophene compounds are obtained by oxidative polymerization, initiated by partially delithiated LiMPO$_4$, of a thiophene compound represented by the following formula (II):

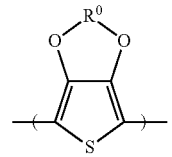

In the formula (II), R$^1$ and R$^2$ have the same meanings as those of R$^1$ and R$^2$ in the formula (I), respectively. A particularly preferable example of the thiophene compound represented by the formula (II) is 3,4-ethylenedioxythiophene (EDOT).

In the formula (I), where R$^1$ and R$^2$ bond to each other to form an alkylene group having 1 to 4 carbon atoms, examples of the substituent group on the alkylene group are a C1 to C14 alkyl group, a phenyl group, a hydroxymethyl group, —CH$_2$O—(CH$_2$CH$_2$)$_3$-TTF group (where TTF is a monovalent group derived from a tetrathiafulvalene compound; the same applies to the following cases), —CH$_2$O—(CH$_2$CH$_2$O)$_5$—CH$_2$CH$_2$-TTF group, —CH$_2$O—(CH$_2$CH$_2$)$_3$—S-TTF group, —CH$_2$O—(CH2CH$_2$O)$_5$—CH$_2$CH$_2$—S-TFT group, and —CH$_2$O(CH$_2$)$_3$SO$_3$$^-$Na$^+$ group. More specifically, the polythiophene compound includes a polymer compound containing a repeating unit represented by the following formula (III);

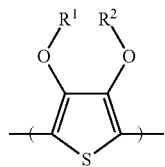

In the formula (III), R$^0$ represents —(CH$_2$)$_2$—, —CH$_2$CH(CH$_3$)—, —CH$_2$CH(C$_6$H$_{13}$)—, —CH$_2$CH(C$_{10}$H$_{21}$)—, —CH$_2$CH(C$_{14}$H$_{29}$)—, —CH$_2$CH(phenyl)-, —(CH$_2$)$_3$—, —CH$_2$CH(CH$_3$)CH$_2$—, —(CH$_2$)$_4$—, o-xylene, —CH$_2$CH(OH)—, —CH$_2$CH(CH$_2$O—(CH$_2$CH$_2$)$_3$—S-trimethylthiotetrathia-fulvalene)-, —CH$_2$CH(CH$_2$O—(CH$_2$CH$_2$O)$_5$—CH$_2$CH$_2$—S-trinnethylthiotetrathiafulvalene)-, or —CH$_2$CH(CH$_2$O(CH$_2$)$_3$SO$_3$$^-$Na$^+$)—.

As the electrically conductive polymer of the Tr electron conjugated material formed in the present invention, use may also be made of polymers derived from the oxidative polymerization of: (E)-1,2-bis(2-(3,4-ethylenedioxy)thienyl)vinylene, 1,4-bis(2-(3,4-ethylenedioxy)thienyl)benzene, 4,4'-bis(2-(3,4-ethylenedioxy)thienyl)biphenyl, 2,5-bis(2-(3,4-ethylenedioxy)thienyl)furan, 2,5-bis(2-(3,4-ethylenedioxy)thienyl)thiophene, or 2,2':5',2"-ter(3,4-ethylenedioxy)thiophene.

In accordance with a specific implementation, the partially delithiated polymerization initiator of the present invention is a compound corresponding to the general formula A$_{1-x}$MXO$_4$ which has an olivine structure, the general formula A$_{1-x}$MXO$_4$ being such that:
  0<x≤1
  A represents Li, alone or partially replaced by at most 10% as atoms of Na and/or K;
  M comprise at least 50% at. of Fe(II) or Mn(II) or mixture thereof;
  XO$_4$ represents PO$_4$, alone or partially replaced by at most 10 mol % of at least one group chosen from SO$_4$ and SiO$_4$.

In one embodiment, the general formula A$_{1-x}$MXO$_4$ includes 0.02<x≤0.4.

In a 1st specific embodiment, the polymerization initiator of the present invention is a compound corresponding to the general formula $A_{1-x}MXO_4$ which has an olivine structure, the general formula $A_{1-x}MXO_4$ being such that:

$0 < x \leq 1$

A represents Li, alone or partially replaced by at most 10% as atoms of Na or K;

M is selected from Fe(II), Mn(II) and mixture thereof, alone or partially replaced by at most 50% as atoms of one or more other metals selected from Ni and Co and/or by at most 15% as atoms of one or more aliovalent or isovalent metals other than Ni or Co, and/or by at most 5% as atoms of Fe(III), $XO_4$ represents $PO_4$, alone or partially replaced by at most 10 mol % of at least one group chosen from $SO_4$ and $SiO_4$.

In a 2nd specific embodiment, the polymerization initiator of the present invention is a compound corresponding to the general formula $A_{1-x}MXO_4$ which has an olivine structure, the formula $A_{1-x}MXO_4$ being such that:

$0 < x \leq 1$

A represents Li, alone or partially replaced by at most 10% as atoms of Na or K;

M is selected from Fe(II), Mn(II) and mixture thereof, alone or partially replaced by at most 50% as atoms of one or more other metals chosen from Ni and Co and/or by at most 15% as atoms of one or more aliovalent or isovalent metals chosen from Mg, Mo, Nb, Ti, Al, Ta, Ge, La, Y, Yb, Cu, Sm, Ce, Hf, Cr, Zr, Bi, Zn, Ca, B and W and/or by at most 5% as atoms of Fe(III);

$XO_4$ represents $PO_4$, alone or partially replaced by at most 10 mol % of at least one group chosen from $SO_4$ and $SiO_4$.

In a 3rd specific embodiment, the polymerization initiator of the present invention is a compound corresponding to the general formula $Li_{1-x}Fe_yMn_{1-y}PO_4$ which has an olivine structure, wherein $0 < x \leq 1$ and $0 \leq y \leq 1$.

In a 4th specific embodiment, the polymerization initiator of the present invention is a compound corresponding to the general formula $Li_{1-x}FePO_4$ which has an olivine structure, wherein $0 < x \leq 1$.

By general formula one means that the stoichiometry of the material can vary by a few percents from stoichiometry due to substitution or other defects present in the structure.

Optionally, the partially delithiated polymerization initiator of the present invention $A_{1-x}MXO_4$ which has an olivine structure, may carry on at least a portion of its surface a film of carbon deposited by pyrolysis, denoted $C-A_{1-x}MXO_4$. The deposit of carbon can present a more or less uniform, adherent and non-powdery deposit. It represents up to 15% by weight, preferably from 0.5 to 5% by weight, with respect to the total weight of the material. Synthesis of partially delithiated $A_{1-x}MXO_4$ and/or $C-A_{1-x}MXO_4$ could be done, without any limitation, by delithiation of $AMXO_4$ and/or $C-AMXO_4$ with chemical oxidizer as described for example by Lemos et al. [A new insight into the $LiFePO_4$ delithiation process, Solid State Ionics, 177 (2006) 1021-1025], C. M. Julien et al. [Structural and Magnetic Properties of $LiFePO_4$ and Lithium Extraction Effects, Z. Anorg. Allg. Chem., 632 (2006) 1598-1605] or Meng et al. [Intermittent X-Ray diffraction study of kinetics of delithiation in nano-scale $LiFePO_4$, Journal of Power Sources, 189 (2009) 702-705]. Lemos and Julien disclosed, respectively, chemical delithiation of $LiM_{0.03}Fe_{0.97}PO_4$ (M=Cr, Cu, Al or Ti) by use of potassium peroxodisulfate ($K_2S_2O_8$) in an aqueous solution, and of $LiFePO_4$ by sodium peroxodisulfate ($Na_2S_2O_8$) in an aqueous solution. Meng disclosed chemical delithiation of $LiFePO_4$ by use of $NO_2BF_4$ oxidizer in an acetonitrile solution.

Methods to produce $AMXO_4$ and/or $C-AMXO_4$ compounds are well known. They can be obtained, for example, via a hydrothermal route, via a solid-state thermal route or via a melt route. Deposition of carbon by pyrolysis of an organic carbon precursor could be performed on $AMXO_4$ or its precursors.

A large choice of oxidizers is available to perform chemical delithiation, such as, without any limitation, chlorine ($Cl_2$), bromine ($Br_2$), iodine ($I_2$), permanganates (for example $KMnO_4$), peroxides (for example $H_2O_2$ or Oxone™), nitronium (for example $NO_2BF_4$) or persulfates (for example peroxodisulfate $K_2S_2O_8$), the person skill in the art is able to identify suitable oxidizer without undue experimentation and without departing from the present invention.

Chemical delithiation is generally performed in solution, preferably, but without any limitation, in aqueous solution.

Hydrogen peroxide is preferred as oxidizer allowing controlled delithiation in water-based solvent with minimum by-products, optionally in presence of a buffer such as, without any limitation, acetic acid ($CH_3COOH$) to avoid eventual acidification of solution, possibly leading to partial dissolution of lithium metal phosphate $AMXO_4$ and/or $C-AMXO_4$.

The inventors also surprisingly discovered that chemical delithiation could be performed efficiently by a gas phase process, for example, a nitrogen oxide gas, especially nitrogen dioxide $NO_2$. For example, exposure of $LiFePO_4$ to $NO_2$ gas allowed preparation of delithiated lithium iron phosphate $Li_{1-x}FePO_4$ with $0 < x \leq 1$.

It is why, in another broad aspect, the present invention also relates to the use of gas phase comprising $NO_2$ to perform delithiation of $AMXO_4$ and/or $C-AMXO_4$ compounds.

In accordance with a specific implementation, lithium cation extracted from $AMXO_4$ and/or $C-AMXO_4$ structure during delithiation by $NO_2$ are recovered as lithium nitrate deposited at the surface of $AMXO_4$ and/or $C-AMXO_4$ as indicated by infrared spectra of delithiated compounds.

It is why, in another broad aspect, the present invention also relates to a composite material of formula $A_{1-x}MXO_4$ and/or $C-A_{1-x}MXO_4$ comprising a $LiNO_3$ deposit.

Lithium is assumed to be quantitatively extracted as lithium nitrate.

It is why, in another broad aspect, the present invention also relates to a composite material of formula $(LiNO_3)_x.A_{1-x}MXO_4$ and/or $(LiNO_3)_x.C-A_{1-x}MXO_4$.

In accordance with a specific implementation, polymerization is performed by contacting partially delithiated $A_{1-x}MXO_4$ and/or $C-A_{1-x}MXO_4$ with unsaturated monomers, preferably in the presence of at least one salt as source of p-doped conductive polymer counter-anion.

In accordance with a specific implementation, salts preferably comprise an alkali salt (Li, Na or K) and most preferably a lithium salt. Anion of those salts may be selected, without any limitation, among halogenide ($F^-$, $Cl^-$, $Br^-$ or $I^-$), sulfate ($SO_4^{2-}$), sulfonate ($CH_3SO_3^-$, $TsO^-$, $FSO_3^-$, $CF_3SO_3^-$, styrene sulfonate, polystyrene sulfonate), acetate ($CH_3CO_2^-$, $CF_3CO_2^-$), imide (($CH_3SO_2)_2N^-$, $(FSO_2)_2N^-$, $(CF_3SO_2)_2N^-$), perchlorate ($ClO_4^-$), borate ($BF_4^-$, bis(oxalato)borate anion, difluoro(oxalato)borate anion), and phosphate ($PF_6^-$).

In accordance with a specific implementation, polymerization could be performed in a solvent or mixture of solvents, such as, without any limitation, water, alcohol (methanol, ethanol, butanol, propanol, isopropanol), acetonitrile, tetrahydrofuran, ethyl acetate, acetone, dimethylformamide, dimethyl sulfoxide. A person skill in the art is able to identify suitable solvents without undue experimentation and without departing from the present invention.

In accordance with a specific implementation, polymerization could also be performed under exposure of $A_{1-x}MXO_4$ and/or $C\text{-}A_{1-x}MXO_4$, with a vapor of unsaturated monomers. For vapor phase polymerization $A_{1-x}MXO_4$ and/or $C\text{-}A_{1-x}MXO_4$ is preferably mixed with an alkali salt, preferably a lithium salt, as source of electronically conductive polymer counter-anion.

The amount of electronically conductive polymer polymerized at the surface of $A_{1-x}MXO_4$ and/or $C\text{-}A_{1-x}MXO_4$ could be modified depending on parameters such as, without any limitation, delithiation ratio, concentration of monomers, reaction temperature, or solvent. Preferably, it represents up to 20% by weight, preferably from 0.5 to 10% by weight, with respect to the total weight of the material. In the specific implementing case of agglomerates, the electronically conducting polymer could act as both an electronic conductor and a binder to improve cyclability of the material when used as the cathode of a lithium ion battery.

In a specific embodiment, $C\text{-}A_{1-x}MXO_4$ is in particulate form or agglomerate of nanoscaled particles, and the deposit of carbon on $C\text{-}A_{1-x}MXO_4$ is deposited on the surface of the particles or inside agglomerate of the nanoscaled particles.

In accordance with a specific implementation, the process of the invention could be performed on $A_{1-x}MXO_4$ and/or $C\text{-}A_{1-x}MXO_4$ in the form of primary particles, agglomerates of primary particle, flakes, fibers, thin film deposit, without departing from present invention.

In accordance with a specific implementation, the process of the invention could be performed in presence of additives, such as, without any limitation, surfactant, polymers, carbon particles, carbon fibers, carbon nanotubes, metallic oxides, or metallic powders.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

All of the references cited supra and infra herein are hereby incorporated by reference in their entirety.

EXAMPLE 1

Chemical Delithiation of C—LiFePO$_4$

To a dispersion of 6.5 grams of C—LiFePO$_4$ (Life Power® P1 available from Phostech Lithium Inc.; Canada) in 250 ml of distilled water under agitation, 250 ml of hydrogen peroxide 30 wt. % in water (available from Sigma-Aldrich; USA) has been added slowly. After 30 min under agitation, partially delithiated C—Li$_{1-x}$FePO$_4$ has been recovered by filtration, washed with water and then dried 24 hours under vacuum at ambient temperature. Atomic absorption analysis of Li$^+$ ion in liquid phase determined a C—Li$_{0.59}$FePO$_4$ composition. The experiment has been repeated by replacing C—LiFePO$_4$ with C—LiFe$_{0.98}$Mg$_{0.02}$PO$_4$ to obtain C—Li$_{0.63}$Fe$_{0.98}$Mg$_{0.02}$PO$_4$.

EXAMPLE 2

Chemical Delithiation of Nanosized LiFePO$_4$ 6.5 grams of nanosized LiFePO$_4$ (D$_{50}$≈0.6 μm) produced by a precipitation process as disclosed in US 2007/054187 (provided by Phostech Lithium Inc., Canada) has been treated as in example 1 but with only 30 ml of hydrogen peroxide 30 wt. % in water. Atomic absorption analysis of Li$^+$ ion in liquid phase determined a Li$_{0.42}$FePO$_4$ composition. The experiment has been repeated by replacing LiFePO$_4$ with LiFe0.7Mn$_{0.3}$PO$_4$ to obtain Li$_{0.56}$Fe$_{0.7}$Mn$_{0.3}$PO$_4$.

EXAMPLE 3

Chemical Delithiation of Nanosized LiFePO$_4$ 2 mL glacial acetic acid (Alfa Aesar) and 5 mL of hydrogen peroxide ACS Grade, 29.0-32.0% (EMD Chemicals) was added to 100 mL of water. LiFePO$_4$ (10.18 g) (D$_{50}$≈0.6 μm) produced by a precipitation process as disclosed in US 2007/054187 (provided by Phostech Lithium Inc., Canada) was added to the solution. The suspension was vigorously stirred for 15 min. The suspension was subsequently filtered and rinsed with water, The Li$_{1-x}$FePO$_4$ was dried at 60° C. overnight in a vacuum oven. The solution was analyzed by atomic emission for quantitative determination of the desinsertion of lithium. Results are provided in the following table.

| Product | Reactant | Quantity | Reaction time |
|---|---|---|---|
| Li$_{1-0.3}$FePO$_4$ | LiFePO$_4$ | 10.18 g | 15 min. |
|  | H$_2$O$_2$ (29-32% wt) | 5.0 mL |  |
|  | CH$_3$COOH | 2 mL |  |
|  | H$_2$O | 100 mL |  |
| Li$_{1-0.25}$FePO$_4$ | LiFePO$_4$ | 10.13 g | 10 min. |
|  | H$_2$O$_2$ (29-32% wt) | 5.0 mL |  |
|  | CH$_3$COOH | 2 mL |  |
|  | H$_2$O | 100 mL |  |
| Li$_{1-0.5}$FePO$_4$ | LiFePO$_4$ | 10.0 g | 20 min. |
|  | H$_2$O$_2$ (29-32% wt) | 2.0 mL |  |
|  | CH$_3$COOH | 5 mL |  |
|  | H$_2$O | 150 mL |  |

EXAMPLE 4

Chemical Delithiation of Nanosized LiFePO$_4$ by Gaseous Oxidant

The set-up consisted of two reaction vessels, connected via plastic tubing and a glass pipe containing anhydrous calcium sulfate. The first reaction vessel was closed air-tight except for the opening to the tube. The vessel, cooled in ice water, contained copper powder and concentrated nitric acid was added drop wise. The produced gas followed the tubing through the calcium sulfate and was then introduced into the second vessel, which was open to the ambient air and which contained 187 mg of C—LiFePO$_4$ Life Power® P1. The gas have a characteristic color, therefore it is easy to determine when the vessel is filled. The 110 ml vessel was filled and kept closed for 30 minutes. The sample was removed and characterized by ATR-FTIR spectroscopy to be approximately completely delithiated.

Similar experiment has been repeated by replacing C—LiFePO$_4$ with nanosized LiFePO$_4$ of example 2. The sample was removed and characterized by ATR-FTIR spectroscopy to be approximately completely delithiated and comprise a deposit of lithium nitrate on its surface.

Similar experiment has been repeated with nanosized $LiFePO_4$ of example 2 while reducing exposure time to 5 min. The sample was removed and characterized to be $Li_{0.59}FePO_4$.

EXAMPLE 5

Chemical Delithiation of Nanosized $LiFePO_4$ 6.3 grams of nanosized $LiFePO_4$ ($D_{50}$=0.6 µm) produced by a precipitation process as disclosed in US 2007/054187 (provided by Phostech Lithium Inc., Canada) has been treated with 3.9 grams of iodosobenzene 1,1-diacetate (available from Sigma-Aldrich; USA) in 30 ml of dry acetonitrile. After 24 hours under agitation, partially delithiated $Li_{1-x}FePO_4$ has been recovered by filtration, washed with water and then dried 24 hours under vacuum at ambient temperature. Atomic absorption analysis of $Li^+$ ion in liquid phase determined a $Li_{0.71}FePO_4$ composition. The experiment has been repeated by replacing $LiFePO_4$ with $LiFe_{0.99}Nb_{0.01}PO_4$ to obtain $Li_{0.68}Fe_{0.99}Nb_{0.01}PO_4$.

EXAMPLE 4

Polymerization of EDOT by Delithiated C—$LiFePO_4$ 2.37 grams of delithiated C—$LiFePO_4$, produced as in example 1 and 1.75 grams of $(CF_3SO_2)_2NLi$ (Fluorad™ Lithium HQ-115 available from 3M™; USA) has been added to 25 ml of methanol, followed by 0.38 gram of 3,4-ethylene-dioxythiophene (available from Sigma-Aldrich; USA) dissolved in 15 ml of butanol. The dispersion was heated at 50° C. during two days under agitation, before the solvent was eliminated using a rotary evaporator, the resulting powder washed three times with 30 ml of methanol and three times with 30 ml of acetonitrile, and then dried under vacuum at 60° C. for 12 hours. The experiment has been repeated with C—$Li_{0.63}Fe_{0.98}Mg_{0.02}PO_4$.

EXAMPLE 5

Polymerization of EDOT by Delithiated $LiFePO_4$ 4.81 grams of delithiated $LiFePO_4$, produced as in example 2 and 4.95 grams of $(CF_3SO_2)_2NLI$ (Fluorad™ Lithium HQ-115 available from 3M™; USA) has been added to 30 ml of methanol/butanol (3:5 vol.), followed by 0.88 gram of 3,4-ethylene-dioxythiophene dissolved in 50 ml of methanol/butanol (3:5 vol.). Dispersion has then been heated at 50° C. during one day under agitation, solvent eliminate with a rotary evaporator. The resulting powder was washed three times with 30 ml of methanol and three times with 30 ml acetonitrile, and then dried under vacuum at 60° C. for 12 hours. The experiment has been repeated with $Li_{0.56}Fe_{0.9}Mn_{0.1}PO_4$. A similar experiment has also been performed by replacing elimination of solvent with rotary evaporator by a spray drying step.

EXAMPLE 6

Polymerization of EDOT by Delithiated $LiFePO_4$ 3.10 g LiTFSI (Fluorad™ Lithium HQ-115 available from 3M; USA) was dissolved in 25 ml of methanol in a Petri dish. After, 0.51 g of 3,4-ethylenedioxy-thiophene (Aldrich) and 4.68 g of $Li_{0.7}FePO_4$, obtained in example 3, was added to the solution. The Petri dish was placed in an oven at 60° C. for 2 hours. A blue color appeared after the evaporation of solvent. The mixture was filtered and rinsed with methanol and acetonitrile. The PEDOT-$LiFePO_4$ (LFP-1) was dried at 60° C. overnight in vacuum oven.

EXAMPLE 7

Polymerization of EDOT by Delithiated $LiFePO_4$ in Vapor Phase 1.48 g LiTFSI (Fluorad™ Lithium HQ-115 available from 3M; USA) was mixed with 1.5 g of $Li_{0.5}FePO_4$, obtained in example 3, and placed in an Erlenmeyer flask. Subsequently, 0.27 g of 3,4-ethylenedioxythiophene (Aldrich) was added to a small flask. This small flask was placed in the Erlenmeyer flask and vacuum was made. The Erlenmeyer flask was then placed in an oven at 60° C. for 2 days. The mixture was filtered and rinsed with methanol and acetonitrile. The PEDOT-$LiFePO_4$ was dried at 60° C. overnight in a vacuum oven (LFP-2).

EXAMPLE 8

Polymerization of EDOT by Delithiated $LiFePO_4$ to Form a Film 1.27 g LiTFSI (Fluorad™ Lithium HQ-115 available from 3M; USA) was mixed with 1.5 g of $Li_{0.5}FePO_4$, obtained in example 3, 0.24 g 3,4-ethylenedioxy-thiophene and 1.5 mL of methanol. The mixture was coated onto an aluminum sheet and put in an oven for 2 hours at 60° C. The thin film of PEDOT-$LiFePO_4$ was removed from the substrate during rinsing with methanol. The mixture was filtered and rinsed with methanol and acetonitrile. The PEDOT-$LiFePO_4$ film was dried at 60° C. overnight in vacuum oven.

EXAMPLE 9

Conductivity Measurement

Electronic conductivity of LFP 1-2 has been obtained by measuring resistance of press pellets, those three powders presents an high electronic conductivity >0.1 S·cm instead of <$10^{-7}$ S·cm for untreated powders.

EXAMPLE 10

Polymerization of EDOT on a Delithiated Cathode

A nanosized $LiFePO_4$ as in example 2 and PVdF-HFP copolymer (supplied by Atochem) were carefully mixed in N-methylpyrrolidone in order to obtain a dispersion composed of the $LiFePO_4$/PVdF-HFP 80/20 by weight mixture. The mixture obtained was subsequently deposited, using a Gardner® device, on a sheet of aluminum carrying a carbon-treated coating (supplied by Intellicoat) and the film deposited was dried under vacuum at 80° C. for 24 hours and then stored in a glovebox.

A 10 $cm^2$ sample (4.3 mg/$cm^2$ loading) of this film was then treated during 10 mn in 20 ml of hydrogen peroxide 30 wt. % in water, washed with water and then dried 24 hours under vacuum at ambient temperature. Film was then placed in a Petri dishes containing 10 ml of methanol/butanol (1:1 vol.), 200 mg of $(CF_3SO_2)_2NLi$ (Fluorad™ Lithium HQ-115 available from 3M; USA) and 50 mg of 3,4-ethylenedioxythiophene. The Petri dish was placed in an oven at 60° C. for 2 hours, washed with methanol and acetonitrile, and then dried under vacuum at 60° C. for 12 hours (LFP-3).

EXAMPLE 11

Characterization in Batteries

Composite cathode electrode was prepared with LFP-1 prepared as in example 6, EBN1010 (product of Superior Graphite) as conductive agent and PVdF-HFP (product of Arkema) as binder in 80/10/10 wt, proportions. Electrochemical performances of cathode coating were investigated at room temperature in coin cell battery using metallic lithium as anode and 1M $LiClO_4$ in EC:DMC (1:1) impregnated in 25 μm polypropylene Celgard™ as electrolyte. Cathode surface was 1.5 cm² with 3.97 mg/cm² LFP-1 loading.

A first slow scan voltametry (20 mV/h), between a voltage of 3.0 V and 3.7 V vs $Li^+/Li^0$ was performed at ambient temperature with a VMP2 multichannel potensiostat (product of Bio-Logic-Science Instruments). Power tests were further performed by intentiostatic experiment, rates were calculated from the specific capacity value obtained from first slow scan voltametry (144.5 mAh/g). At 1 C discharge capacity is 134 mAh/g and at 10 C 112 mAh/g.

Figure 2:
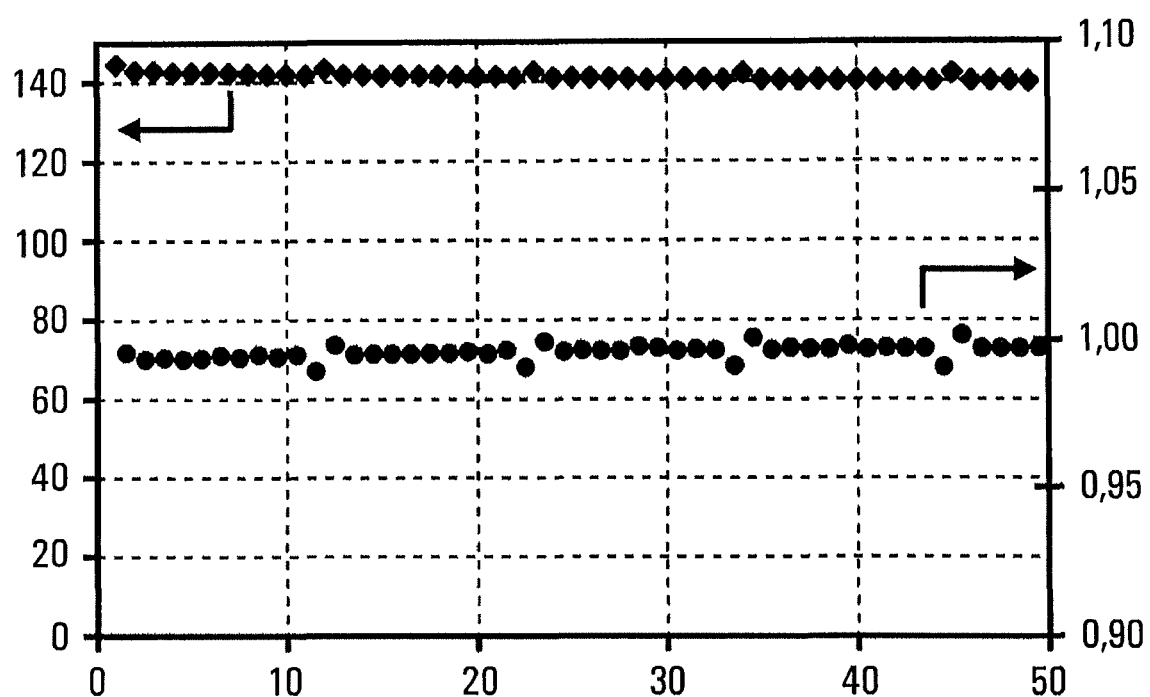
FIG. 2 represents the C/4 galvanostatic cycling curve at 60° C. of a battery of the Li/1M $LiPF_6$ EC:DEC 3:7/$LiFePO_4$-PEDOT type. The capacity of the battery (in mAh per g of $LiFePO_4$-PEDOT) is indicated on left ordinate, the coulombic efficiency (coulomb charge/coulomb discharge) on right ordinate, and the number of cycles is shown on the abscissa.

The battery was then subjected to C/4 galvanostatic cycling at 60° C. The curve is represented in FIG. 2.

Another battery has been assembled by using LFP-3 coating obtained in example 10. Slow scan voltametry at ambient temperature determine a 146 mAh/g capacity and subsequent C/4 galvanostatic cycling at 60° C. provide a capacity >140 mAh/g after 50 cycles.

The above description of the embodiments should not be interpreted in a limiting manner since other variations, modifications and refinements are possible within the spirit and scope of the present invention. The scope of the invention is defined in the appended claims and their equivalents.

The invention claimed is:

1. A method of synthesizing an organic electronically conductive polymer in presence of a partially delithiated alkali metal phosphate of the general formula $A_{1-x}MXO_4$, said method comprising:
   contacting said partially delithiated alkali metal phosphate with chemical reactants comprising unsaturated monomers or a mixture of unsaturated monomers; and
   initiating with said partially delithiated alkali metal phosphate the polymerization of said unsaturated monomers or mixture of unsaturated monomers to form an electronically conductive polymer;
   wherein: $0<x<1$; A represents at least 90 atomic % Li; M comprise at least 50% at. Fe(II) or Mn(II) or a mixture thereof; $XO_4$ represents $PO_4$, alone or partially replaced by at most 10 atomic % of at least one group selected from $SO_4$ $SiO_4$.

2. A method as in claim 1 wherein the electronically conductive polymer is at least partially grafted on the surface of said alkali metal phosphate.

3. A method as in claim 2 wherein M comprises at least 90 atomic % of Fe(II) or Mn(II) or a mixture thereof.

4. A method as in claim 2 wherein said unsaturated monomers comprise substituted or unsubstituted pyrrole, thiophene, aniline or any mixtures thereof.

5. A method as in claim 4 wherein said unsaturated monomers comprise 3,4-ethylenedioxythiophene.

6. A method as in claim 1 wherein said $A_{1-x}MXO_4$ is obtained by partial delithiation of $AMXO_4$.

7. A method as in claim 6 wherein said partial delithiation is performed by oxidant.

8. A method as in claim 7 wherein said oxidant comprises $H_2O_2$, $Br_2I_2$, persulfate, peroxodisulfate or any mixture thereof.

9. A method as in claim 8 wherein said partial delithiation is performed in aqueous media.

10. A method as in claim 1 wherein said polymerization is performed in solution.

11. A method as in claim 10 wherein said solution comprises alcohol.

12. A method as in claim 1 wherein said polymerization is performed in a vapor phase of the monomers.

13. A method as in claim 1 wherein said polymerization is performed in a gas phase.

14. A method as in claim 10 wherein polymerization is performed in presence of an alkali salt.

15. A method as in claim 14 wherein said alkali salt comprises an anion selected from halogenide, sulfate, sulfonate, acetate, imide, perchlorate, borate and phosphate.

16. A method as in claim 14 wherein said alkali salt is a lithium salt.

17. A method as in claim 14 wherein said alkali salt comprises $(CF_3SO_2)_2NLi$.

18. A method as in claim 1 wherein said partially delithiated alkali metal phosphate has the general formula $Li_{1-x}FePO_4$ wherein: $0<x<1$.

19. A method as in claim 1 wherein said partially delithiated alkali metal phosphate is present as particles or agglomerates of particles.

20. A method as in claim 1 wherein $0.02<x<0.4$.

21. A method as in claim 1 wherein $A_{1-x}MXO_4$ comprises a carbon deposit obtained by pyrolysis of an organic precursor.

22. A method as in claim 6 wherein said partial delithiation is performed by a gaseous oxidant comprising $NO_2$.

23. A method as in claim 11 wherein polymerization is performed in presence of an alkali salt.

24. A method as in claim 23 wherein said alkali salt comprises an anion selected from halogenide, sulfate, sulfonate, acetate, imide, perchlorate, borate and phosphate.

25. A method as in claim 23 wherein said alkali salt is a lithium salt.

26. A method as in claim 23 wherein said alkali salt comprises $(CF_3SO_2)_2NLi$.

27. A method as in claim 12 wherein polymerization is performed in presence of an alkali salt.

28. A method as in claim 27 wherein said alkali salt comprises an anion selected from halogenide, sulfate, sulfonate, acetate, imide, perchlorate, borate and phosphate.

29. A method as in claim 27 wherein said alkali salt is a lithium salt.

30. A method as in claim 27 wherein said alkali salt comprises $(CF_3SO_2)_2NLi$.

31. A method as in claim 13 wherein polymerization is performed in presence of an alkali salt.

32. A method as in claim 31 wherein said alkali salt comprises an anion selected from halogenide, sulfate, sulfonate, acetate, imide, perchlorate, borate and phosphate.

33. A method as in claim 31 wherein said alkali salt is a lithium salt.

34. A method as in claim 31 wherein said alkali salt comprises $(CF_3SO_2)_2NLi$.

* * * * *